(No Model.)
C. D. MILLER & G. L. EASON.
TEETH CLEANING ATTACHMENT FOR GARDEN RAKES.
No. 253,307. Patented Feb. 7, 1882.
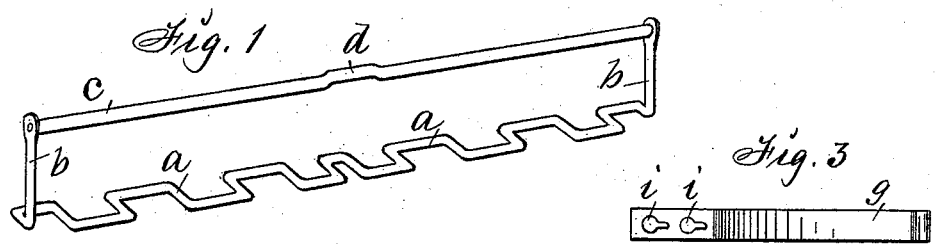
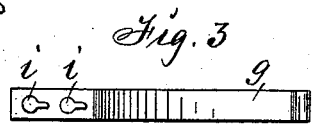
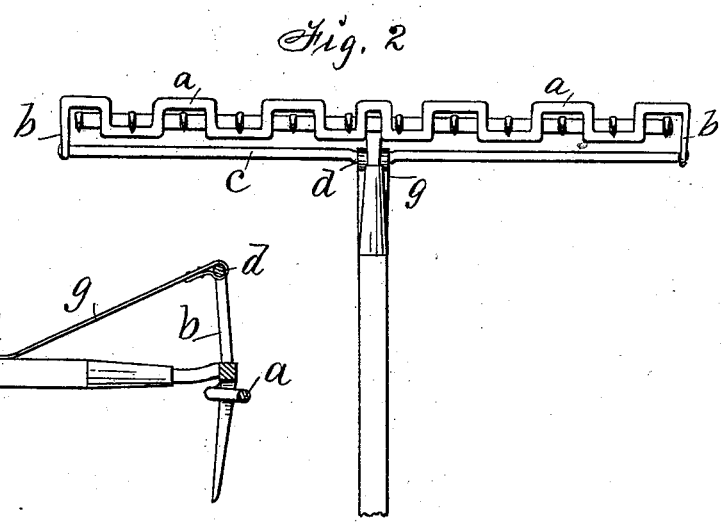
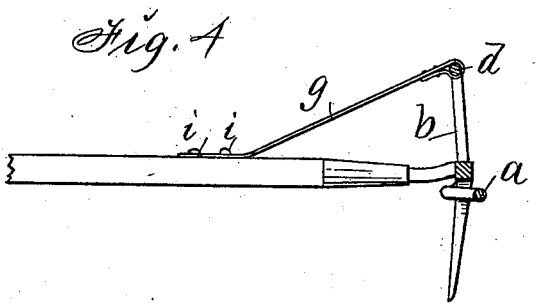
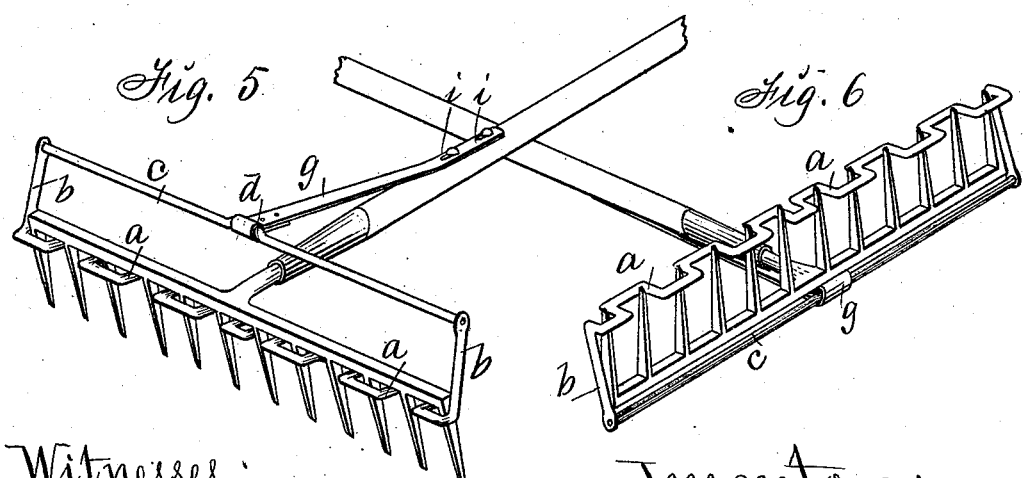
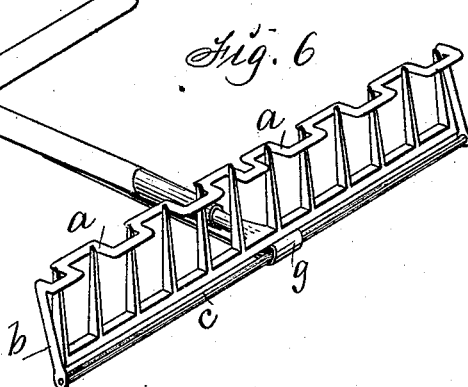
Witnesses:
S. Van Cleve
Frank W. Heis
Inventors:
Charles D. Miller,
George L. Eason,
By Thomas G. Orwig, Atty.

UNITED STATES PATENT OFFICE.

CHARLES D. MILLER AND GEORGE L. EASON, OF DES MOINES, IOWA, ASSIGNORS OF ONE-THIRD TO A. D. CRAIN, OF SAME PLACE.

TEETH-CLEANING ATTACHMENT FOR GARDEN-RAKES.

SPECIFICATION forming part of Letters Patent No. 253,307, dated February 7, 1882.

Application filed October 10, 1881. (No model.)

*To all whom it may concern:*

Be it known that we, CHARLES D. MILLER and GEORGE L. EASON, of Des Moines, in the county of Polk and State of Iowa, have invented a Teeth-Cleaning Attachment for Hand-Rakes, of which the following is a specification.

The object of our invention is to provide an automatic device for cleaning the teeth of a garden or hand rake by simply inverting the rake and pressing it upon the ground.

Heretofore a perforated clearing-bar has been combined with a rake and operated by means of a spring fixed to the rake-handle in such a manner that the spring in its normal condition would hold the perforated bar down near the points of the teeth, and as the teeth were pressed into the ground or rubbish the bar would rise toward the rake-head. A relaxation of the downward pressure of the rake, or lifting the rake, would allow the spring to resume its normal position and press the bar downward again toward the points of the teeth for the purpose of pushing and stripping off any leaves, grass, or rubbish adhering to the teeth. But the devices thus constructed and applied fail to act satisfactorily in doing the work contemplated, because the perforated bar comes in contact with the ground and rubbish whenever the rake-teeth do, and scrapes, catches, and gathers obstructions and allows them to enter and clog on the teeth between the moving clearing-bar and the rake-head, so as to necessitate their removal by hand to free the rake and clogged clearing-bar. We overcome such difficulties by forming a clearing bar and frame of wire or metal rods and combining it with a spring, as hereinafter fully set forth, in such a manner that the spring will in its normal condition hold the clearing-bar up against the under side of the rake-head and retain it there out of the way of obstructions while the rake is in use, and also allow it to descend to the points of the teeth when the rake is inverted and the frame of the clearing device pressed upon the ground for the purpose of pushing off obstructions and cleaning the teeth.

Figure 1 of our accompanying drawings is a perspective view of our clearing bar and frame. Fig. 2 is an inverted rake, showing the complete teeth-cleaning device detached. Fig. 3 is a top view of the spring. Fig. 4 is a detail view, showing the spring in its normal condition and the clearing-bar pressed against the under side of the rake-head. Fig. 5 is a perspective view, showing the rake in position for practical use. Fig. 6 is a perspective view, showing the rake inverted and the clearing bar and frame pressed toward the points of the teeth as required to push off adhering matter. Jointly considered, these figures clearly illustrate the construction, application, operation, and utility of our complete invention.

$a\ a$ represent our clearing-bar, preferably made of galvanized wire, and bent into serpentine form to adapt it to be placed and retained between the rake-teeth. Its ends $b$ are bent upward at right angles, and their extremities flattened and perforated.

$c$ is a wire of corresponding size, adapted in length to be connected with the parts $b$ by inserting its ends in their perforations and riveting them fast, or in any suitable way, so as to produce a rigid frame.

$d$ represents the center of the piece $c$, bent laterally to facilitate the fastening of a spring thereto.

$g$ represents a spring, preferably made of a steel strap. It has an eye or loop formed on its rear end to inclose the center and laterally-bent portion, $d$, of the part $c$, to be riveted fast or otherwise securely fixed thereto. It has perforations or eyes $i$ at its front end, adapting it to be detachably connected with the rake-handle, as clearly shown in Fig. 5, by simply pressing the spring upon the handle in such a manner as to allow the heads of screws or studs projecting from the handle to enter and pass through the enlarged ends of the elongated perforations, and then sliding the spring forward to be clamped fast thereto by the heads of the fixed studs. Our complete device may be thus or in any suitable way permanently or detachably fastened to a rake, to be advantageously used in the manner hereinbefore set forth.

From the detailed description of the construction, application, and operation of our invention its practical operations and advantages are obvious, and a repetition of its functions and the manner of using it is deemed unnecessary.

We claim as our invention—

1. The combined clearing-bar and frame, consisting of the bent wire or rod $a\ a$, adapted to be intertwined between rake-teeth, and the frame $b\ b\ c$, adapted to extend above the rake-head, substantially as shown and described, for the purposes specified.

2. The attachment for cleaning rakes, composed of the combined clearing-bar and frame $a\ b\ c$ and the spring $g$, adapted to be fastened to a rake-handle, substantially as set forth, to operate in the manner described, for the purposes specified.

3. A combined clearing-bar and frame adapted to surround, extend between, or intertwine the teeth of a rake, a spring extending from said frame and adapted to be fastened to a rake-handle, arranged and combined relative to each other and a rake substantially as shown and described, to operate in the manner set forth, for the purposes specified.

CHARLES D. MILLER.
GEORGE L. EASON.

Witnesses:
GEO. H. GARDNER,
D. G. EDMUNDSON.